United States Patent
Kline et al.

(10) Patent No.: US 7,113,097 B2
(45) Date of Patent: Sep. 26, 2006

(54) UNDERWATER DEVICE WITH TRANSMITTER

(75) Inventors: John Wallace Kline, Star Tannery, VA (US); Frederick R. Dental, Viewtown, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 312 days.

(21) Appl. No.: 10/700,166

(22) Filed: Nov. 3, 2003

(65) Prior Publication Data

US 2005/0093691 A1    May 5, 2005

(51) Int. Cl.
G08B 23/00    (2006.01)

(52) U.S. Cl. ............... 340/573.1; 340/850; 340/854.1; 340/854.6; 114/322; 701/23

(58) Field of Classification Search ............. 340/573.1, 340/850, 854.1, 854.6; 114/322
See application file for complete search history.

(56) References Cited

U.S. PATENT DOCUMENTS

| | | | | |
|---|---|---|---|---|
| 4,923,057 A | * | 5/1990 | Carlson et al. | 188/378 |
| 5,831,970 A | * | 11/1998 | Arao | 370/227 |
| 6,842,674 B1 | * | 1/2005 | Solomon | 701/23 |
| 2004/0065247 A1 | * | 4/2004 | Horton | 114/322 |
| 2005/0249036 A1 | * | 11/2005 | Davies et al. | 367/99 |

* cited by examiner

Primary Examiner—Jeffery Hofsass
Assistant Examiner—Samuel J Walk
(74) Attorney, Agent, or Firm—DeMont & Breyer, LLC

(57) ABSTRACT

An apparatus that attaches to a moving, typically man-made, underwater object and that is capable of sending a signal is disclosed. The apparatus includes a housing, which in some embodiments is configured to look like an underwater organism. Within or on the housing is a coupling device by which the housing couples, advantageously reversibly, to the underwater object. The housing also incorporates a transmitter that generates and transmits a signal. The housing also includes an energy storage device (e.g., capacitor, battery, etc.), which is used to power the transmitter and, as required, the coupling device. The housing also incorporates a generator, which generates the energy that is stored in the energy storage device.

19 Claims, 4 Drawing Sheets

UNDERWATER DEVICE WITH TRANSMITTER

The U.S. Government has a paid-up license in this invention and the right in limited circumstances to require the patent owner to license others on reasonable terms as provided for by the terms of Contract No. N0039-00-C-2223 awarded by the U.S. Navy.

FIELD OF THE INVENTION

The present invention relates generally to underwater devices.

BACKGROUND

There are circumstances when it is desirable to track an underwater object, typically a man-made object. In some cases, it will be desirable to track the object for an extended period of time and over great distances. In some situations, it is advantageous to implement the tracking in such a way that the tracked object, or an entity controlling it, is unaware that it is being tracked.

SUMMARY

The illustrative embodiment of the present invention is an apparatus that attaches to a moving, typically man-made, underwater object.

In the illustrative embodiment, the apparatus includes a housing, which in some embodiments is configured to look like an underwater organism, such as a remora. Within or on the housing is a coupling device by which the housing couples to the underwater object. In some embodiments, the coupling device is a magnet. The magnet is advantageously an electromagnet, so that, with an appropriate control mechanism, the housing can be decoupled from the object.

The housing also incorporates a transmitter. The transmitter generates and transmits a signal that can be received and processed by appropriate tracking electronics, thereby enabling the moving underwater object (to which the apparatus is attached) to be tracked. The transmitted signal is advantageously an acoustic signal.

The housing also includes an energy storage device (e.g., capacitor, battery, etc.). The energy storage device is used to power the transmitter and, as required, the coupling device. The housing also incorporates a generator, which generates that is stored in the energy storage device. In some embodiments, energy generated by the generator can be directly delivered to the transmitter and/or coupling device as well as being directed to the energy storage device.

In the illustrative embodiment, a portion of the housing is physically adapted to move (e.g., back and forth in the manner of the posterior section of a swimming fish, etc.) when the apparatus is moved through the water (by the underwater object to which it is attached). The movement of the housing drives the generator. More particularly, in some embodiments, the generator comprises a piezoelectric polymer film that is coupled to the movable portion of the housing. As the movable portion moves, the strain energy in the housing is transformed to electrical energy by the piezoelectric polymer film.

In a further aspect of the invention, a method is disclosed. In some embodiments, the method comprises the operations of:
reversibly coupling a housing to an object that is submerged in water;
generating energy by moving said housing through said water;
storing the generated energy in an energy storage device; and
delivering the stored energy to a transmitter.

These and other features of the illustrative embodiment of the present invention are described in detail in the following Detailed Description and depicted in the appended Drawings.

DETAILED DESCRIPTION

Figure 1:
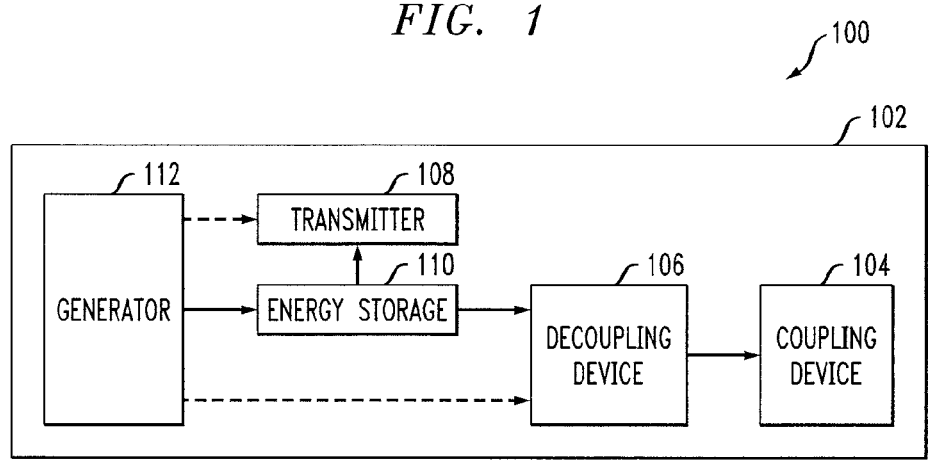
FIG. 1 depicts an apparatus in accordance with the illustrative embodiment of the present invention.

FIG. 1 depicts apparatus 100 in accordance with the illustrative embodiment of the present invention. In some embodiments, apparatus 100 reversibly attaches to a moving, typically man-made, underwater object.

In the illustrative embodiment depicted in FIG. 1, apparatus 100 includes housing 102, coupling device 104, decoupling device 106, transmitter 108, energy storage device 110, and generator 112, electrically coupled as shown. Coupling device 104, decoupling device 106, transmitter 108, energy storage device 110, and generator 112, are physically associated with housing 102. The term "physically associated," as used in this specification in this context, means that the element of interest (e.g., coupling device, etc.) is disposed completely or partially within housing 102 or is disposed on the exterior of housing 102.

Housing 102 is formed of a material that is suitably robust (e.g., will not crack, corrode, dissolve, etc.) for the environment in which it will be used (e.g., fresh water, sea water). For example, in some embodiments, housing 102 is formed from a polymer (e.g., plastic, etc.) In some embodiments, housing 102 is formed from a flexible or pliable material, such as rubber, etc. Those skilled in the art will be able to select a variety of others materials for use as housing 102.

Housing 102 can have virtually any shape, although a specific application will often suggest a particular form factor. For any of a variety of reasons, it will often be desirable to provide housing 102 with a shape or configuration that is a replica of, or at least suggestive of an underwater organism. An example of a housing configured as an underwater organism—a remora—is described later in this specification.

Coupling device 104 couples housing 102 to an underwater object. In some embodiments in which the underwater object is magnetic, coupling device 104 is a magnet, such as a permanent magnet or an electromagnet. Other implementations of coupling device 104 (e.g., hooks, suction cups, netting, etc.) can suitably used as a function of the specifics (e.g., shape, material, etc.) of the underwater object of interest.

In certain circumstances, it might be desirable to be able to decouple apparatus 100 from the underwater object to which it is coupled. For example, in some applications, it might be necessary or otherwise advantageous to decouple apparatus 100 from an underwater object if that object surfaces, stops moving, etc. Consequently, in some embodiments, apparatus 100 includes decoupling device 106.

The specifics of decoupling device 106 depend, to some extent, on the structure of coupling device 104. For example, in embodiments in which coupling device 104 is an electromagnet, decoupling device 106 can be, for example, a switch that interrupts power to the electromagnet. Assume, for example, that the event that triggers decoupling is the depth of apparatus 100 (e.g., decouple when apparatus 100 is at or above a depth of 5 meters, etc.). For such a scenario, in some embodiments, a pressure switch is used as decoupling device 106. In particular, the pressure switch can be electrically connected between the energy supply for the electromagnet and the electromagnet. Below a target depth, the switch is closed so that electricity flows to the electromagnet. But at or above the target depth, the pressure switch opens so that the electromagnet is no longer powered. Apparatus 100 then decouples from the underwater object. In view of the present teachings, those skilled in the art will be able to appropriately select and use a variety of other types of devices as decoupling device 106.

Transmitter 108 is used to transmit a signal, either continuously or intermittently. Transmitter 108 is powered by energy storage device 110, or directly via generator 112.

In most embodiments, the transmitted signal is acoustic. The transmission of an acoustic signal is generally preferably due to the limitations associated with the transmission of electronic or optical signals (e.g., transmitter-size requirements for electronic signals and limited propagation distance for optical signals, etc.).

Figure 2:
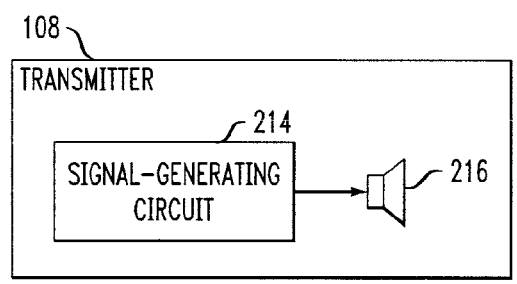
FIG. 2 depicts a transmitter for use in conjunction with the apparatus of FIG. 1.

FIG. 2 depicts an embodiment of transmitter 108 for use in applications in which the transmitted signal is an acoustic signal. In the embodiment depicted in FIG. 2, transmitter 108 includes signal-generating circuit 214 and transducer 216. In some embodiments, signal-generating circuit 214 is an RC circuit. Transducer 216 changes the form of the signal generated by signal-generating circuit 214. For example, in some embodiments in which the transmitted signal is an acoustic signal, the transducer 216 is a speaker.

Generator 112 enables apparatus 100 to operate for an extended period of time by either directly or indirectly powering coupling device 104 and/or transmitter 108. Generator 112 is advantageously powered by mechanical energy from the surrounding water.

More particularly, in operation, apparatus 100 is coupled to an underwater object. When the underwater object moves, apparatus 100 moves along with it, creating a flow of water past apparatus 100. The energy from the flowing water is harnessed by generator 112.

A variety of mechanisms or arrangements can serve as generator 112. In some embodiments, generator 112 comprises a water wheel and an electrical generator. Housing 102 has an opening that is positioned to enable water to "flow" past the water wheel as apparatus 100 is moved through the water. The "flow" of water turns the water wheel which, in turn, cranks the electrical generator.

In some other embodiments, a hydropiezoelectric generator is used to generate electricity. This technology is under development by Ocean Power Technologies Inc. of Pennington, N.J. (See, e.g., "Energy Harvesting Eel Program," www.darpa.mil/dso/trans/energy/pa_opt.html) As employed in conjunction with the illustrative embodiment, the hydropiezoelectric generator is implemented using a piezoelectric polymer film or sheet and a variation of housing 102.

In one such embodiment, a portion of housing 102 is physically adapted to move independently of the rest of the housing as apparatus 100 is dragged through water. That is, the housing is hinged, jointed, or otherwise flexible to enable independent movement of a portion thereof. For example, in some embodiments, the movable portion of housing 102 is appropriately configured, based on hydrodynamics, etc., to move back and forth as apparatus 100 is dragged through the water (e.g., similar to the movement of the posterior portion of a fish as it swims through water).

Coupled to the movable portion of housing 102 are one or more piezoelectric polymer films or sheets. In some embodiments, the piezoelectric polymer comprises polyvinylidene fluoride. Since they are coupled, the piezoelectric polymer film moves as the movable portion of housing 102 moves. Electrodes are attached to film. The movement (i.e., stretching and releasing) of the film generates high voltage, low-frequency electricity. The electricity passes to the electrodes and is then conditioned, as appropriate. The energy can be stored in energy storage device 110 and/or used to directly power one or both of coupling device 104 and transmitter 108.

Figure 3:
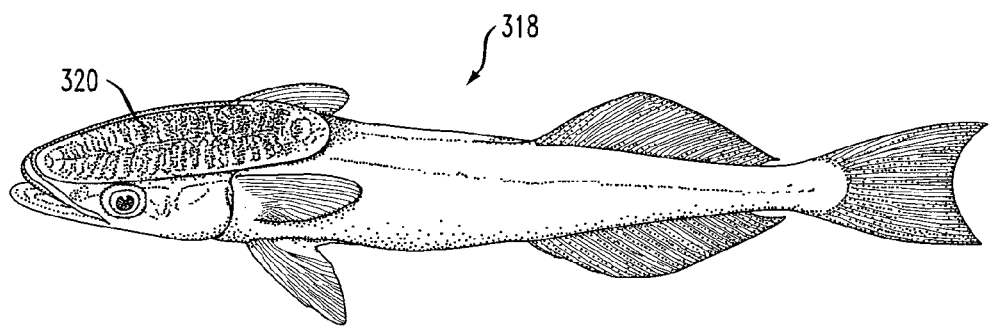
FIG. 3 depicts a remora.

As previously described, in some embodiments, housing 102 advantageously has a shape or configuration that is a replica of, or at least suggestive of an underwater organism. In some embodiments of apparatus 100, housing 102 is configured like a remora. Remora fish 318 is depicted in FIG. 3, and housing 102 configured to look like a remora is depicted in FIG. 4.

A remora is any of several species of warm-water fishes of the family Echeneldae, which are characterized by an oval sucking disk 320 on the top of the head. This disk, which is a modification of the dorsal fin, enables the remora to attach itself to a shark, swordfish, marlin, sea turtle, and even boats. The various species of remora range in size from about 18 centimeters to 90 centimeters in length.

Figure 4:
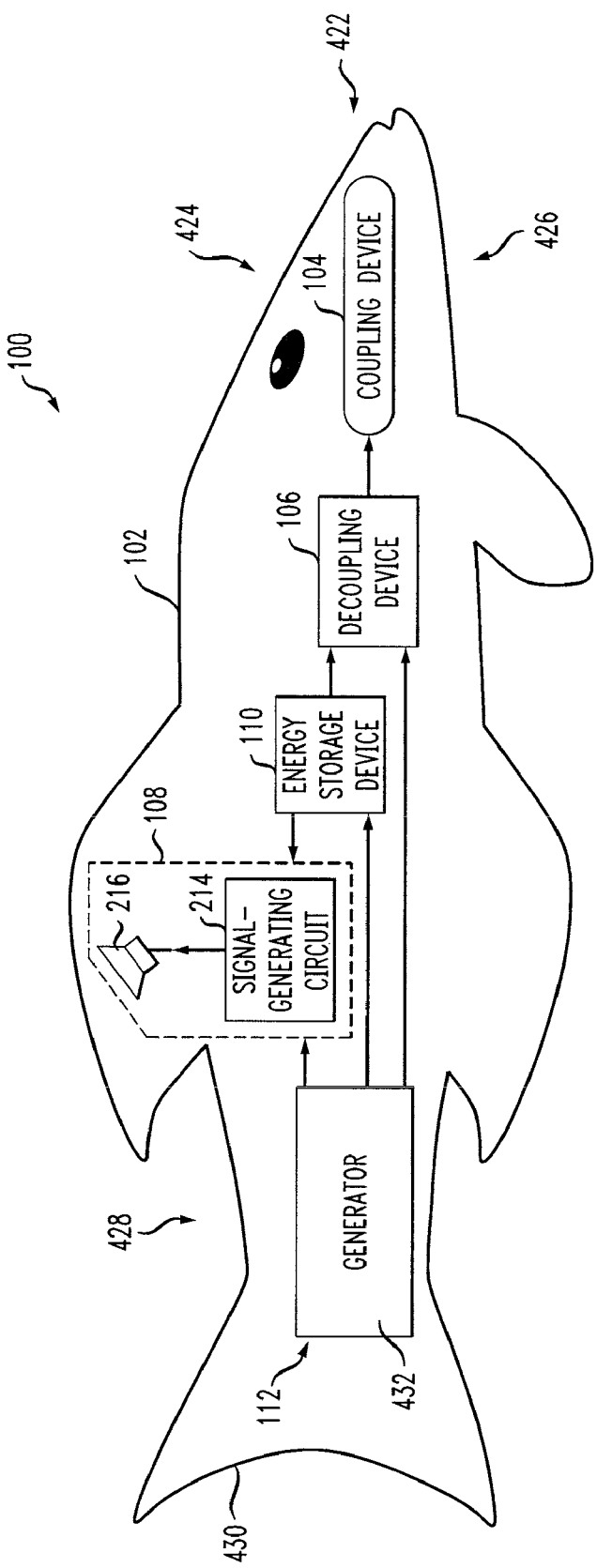
FIG. 4 depicts a variation of the illustrative embodiment, wherein the housing of the apparatus has a remora-like shape and look.

In the embodiment of apparatus 100 that is depicted in FIG. 4, remora-shaped housing 102 includes coupling device 104, decoupling device 106, transmitter 108, energy storage device 110, and generator 112. In the pictured embodiment, coupling device 104 is implemented as an electromagnet, decoupling device 106 is implemented as a pressure switch, transmitter 108 includes a signal-generating circuit 214 and a transducer 216, energy storage device 110 is a bank of capacitors, and generator 112 is implemented as a hydropiezoelectric generator.

Coupling device 104 is disposed at anterior portion 422 of housing 102. While sucking disk 320 of a remora fish is located on top of the head, coupling device 104 can be located either at dorsal region 424 or ventral region 426 (as shown). In the illustrative embodiment, coupling device 104 (the electromagnet) is located completely within housing 102. In some other embodiments (not depicted), at least a portion of coupling device 104 is located outside of housing 102.

The hydropiezoelectric generator is disposed at posterior portion 428 of housing 102. Tail fin 430 is configured, in known fashion in accordance with hydrodynamics, so that as apparatus 100 is moved through water, tail fin 430 moves back and forth.

Piezoelectric polymer film 432 is coupled to the movable portion of housing 102 (e.g., tail fin 430, etc.) so that the film moves as the movable portion of housing 102 moves. As previously described, the piezoelectric polymer film produces a small current when flexed. This is used to charge the capacitors (energy storage device 110) or directly drive the electromagnet (coupling device 104) and/or transmitter 108, or both.

Figure 5:
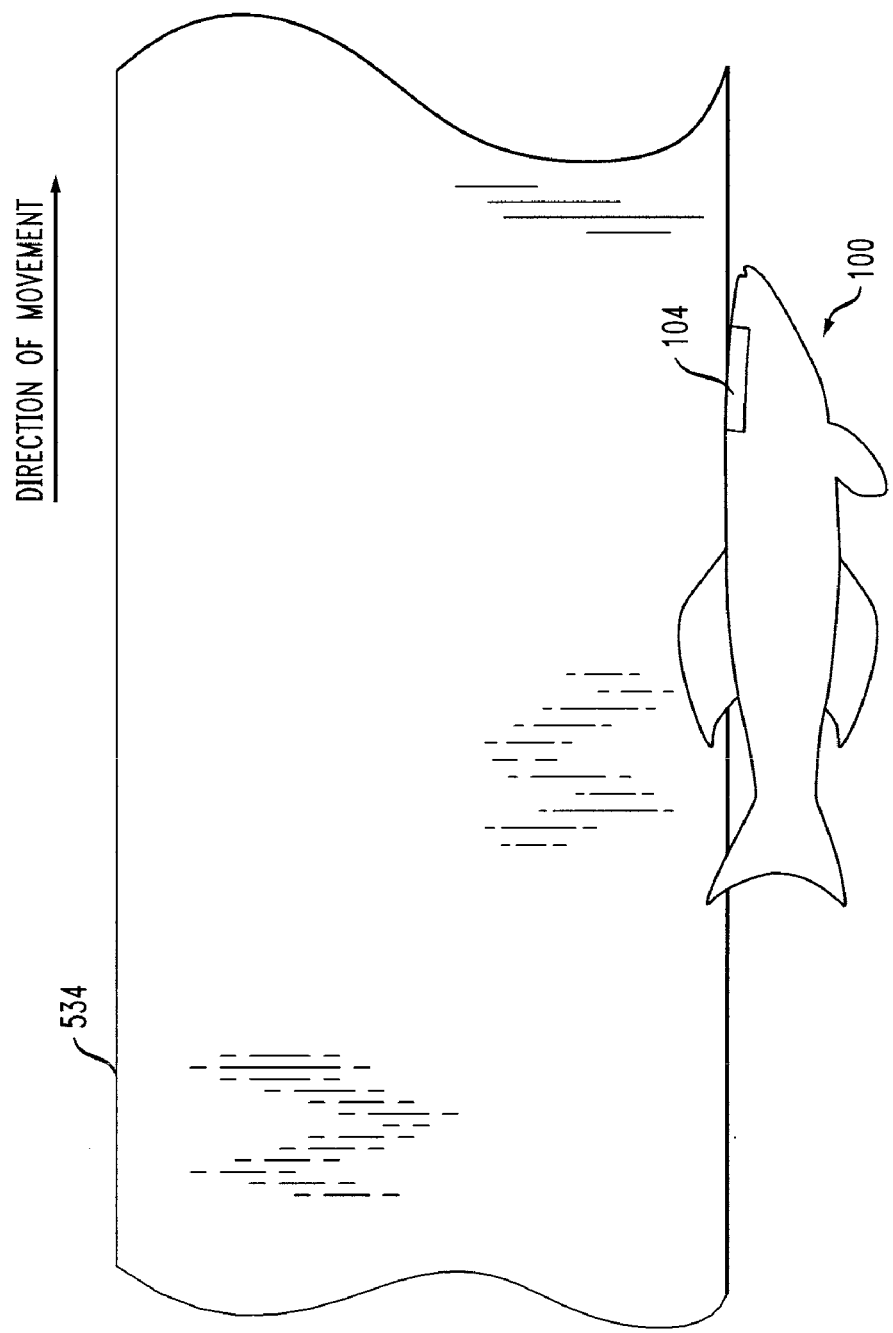
FIG. 5 depicts the apparatus of FIG. 3 coupled to an underwater object.

In use, apparatus 100 is deployed in any convenient manner (e.g., dropped from an aircraft, launched by an underwater vessel, etc.) in the path of the underwater object of interest. Coupling device 104 couples housing 102 to the object of interest. Assuming that the object of interest is moving, apparatus 100 will turn into the water flow. That is, apparatus 100 will orient itself such that the anterior portion of housing 102 will be leading (assuming that coupling device 104 is disposed proximal to the anterior portion of housing 102). FIG. 5 depicts apparatus 100 coupled, via coupling device 104, to moving, underwater object of interest 534.

If the object of interest rises above a certain depth, the pressure switch (i.e., decoupling device 106) will open thereby de-energizing the electromagnet. Consequently, apparatus 100 will decouple from the object of interest. In some other embodiments, it is desirable for apparatus 100 to decouple when the object of interest stops moving. In some of these embodiments, decoupling device 106 comprises an accelerometer (e.g., a MEMS accelerometer, etc.) and a switch. If the object of interest stops moving, the accelerometer causes the switch to open, thereby de-energizing the electromagnet.

Figure 6:
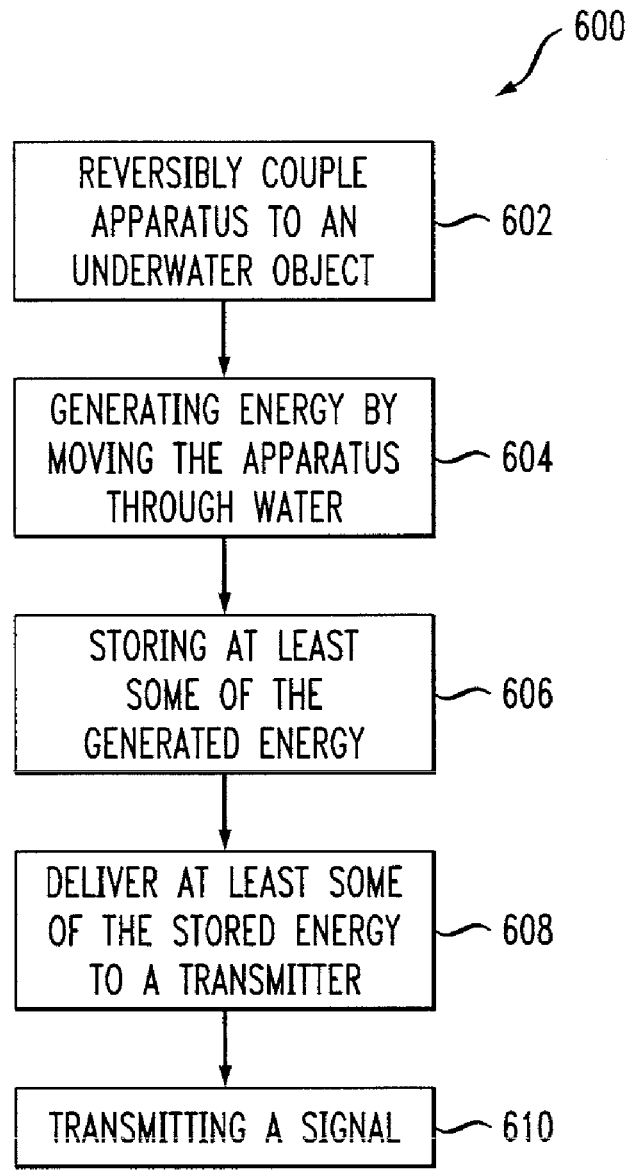
FIG. 6 depicts a flow chart of method in accordance with the illustrative embodiment of the present invention.

FIG. 6 depicts a flow diagram of method 600 in accordance with the illustrative embodiment of the present invention.

Operation 602 of method 600 requires reversibly coupling an apparatus to an object that is submerged in water, wherein the apparatus is capable of transmitting a signal. As previously described, this can be performed using an electromagnet or other devices.

Operation 604 recites generating energy by moving the apparatus through the water. This can be done in a variety of ways, such as by using a water wheel or a hydropiezoelectric generator.

In operation 606, at least a portion of the energy that is generated is stored in an energy storage device. As previously described, stored energy can be delivered to a bank of capacitors, rechargeable batteries, and the like.

According to operation 608, the stored energy is delivered to a transmitter, and in operation 610, the transmitter sends a signal.

It is to be understood that the above-described embodiments are merely illustrative of the present invention and that many variations of the above-described embodiments can be devised by those skilled in the art without departing from the scope of the invention. For example, in some variations of the illustrative embodiment, the rotary-acting valve functions as a single-stage valve for any of a variety of services. And in some other variations of the illustrative embodiment, the rotary-acting valve serves as the first stage of a valve having more than two stages. It is therefore intended that such variations be included within the scope of the following claims and their equivalents.

We claim:

1. An apparatus comprising:
    a housing, wherein said housing has the shape of a remora;
    a coupling device that is physically associated with said housing, wherein said coupling device reversibly couples said housing to an object that is underwater;
    a transmitter that is physically associated with said housing;
    an energy-storage device, wherein said energy-storage device provides power to at least one of said transmitter and said coupling device; and
    a generator, wherein said generator provides power to at least one of said transmitter and said electrical storage device.

2. The apparatus of claim 1 wherein said coupling device is an electromagnet and further wherein said coupling device is disposed proximal to an anterior portion of said remora-shaped housing.

3. The apparatus of claim 1 further comprising a decoupling device, wherein said decoupling device causes said coupling device to de-couple said housing from said object upon occurrence of a condition.

4. The apparatus of claim 3 wherein said condition is selected from the group consisting of said object being at or above a desired depth underwater and when said apparatus stops moving.

5. An apparatus comprising:
    a housing, wherein said housing has the shape of a water-dwelling organism;
    a coupling device that is physically associated with said housing, wherein said coupling device reversibly couples said housing to an object that is underwater;
    a transmitter that is physically associated with said housing;
    an energy-storage device, wherein said energy-storage device provides power to at least one of said transmitter and said coupling device; and
    a generator, wherein said generator provides power to at least one of said transmitter and said electrical storage device, and further wherein said generator comprises a piezoelectric polymer.

6. The apparatus of claim 5 wherein said housing comprises a flexible portion, and wherein said piezoelectric polymer is in the form of a film, and further wherein said film is disposed in said flexible portion.

7. An apparatus comprising:
    a housing, wherein:
        (a) said housing has the shape of a water-dwelling organism;
        (b) said housing comprises a first portion and a second portion;
        (c) said second portion is physically configured to move independently of said first portion;
    a coupling device that is physically associated with said housing, wherein said coupling device reversibly couples said housing to an object that is underwater;
    a transmitter that is physically associated with said housing;
    an energy-storage device, wherein said energy-storage device provides power to at least one of said transmitter and said coupling device; and
    a generator, wherein said generator provides power to at least one of said transmitter and said electrical storage device.

8. The apparatus of claim 7 wherein said second portion is physically configured to move back and forth as said apparatus moves through water.

9. The apparatus of claim 8 wherein a piezoelectric polymer is coupled to said second portion of said housing.

10. An apparatus comprising:
    a housing, wherein said housing has a shape of a remora, and wherein said housing has anterior portion and a posterior portion;
    a coupling device, wherein said coupling device is physically associated with said housing proximal to said anterior portion, and wherein said coupling device reversibly couples said housing to an object that is underwater;

a transmitter that is physically associated with said housing;

an energy-storage device, wherein said energy-storage device provides power to at least one of said transmitter and said coupling device; and a generator, wherein said generator provides power to at least one of said transmitter and said electrical storage device, and wherein said generator is physically associated with said housing proximal to said posterior portion.

11. The apparatus of claim 10 wherein said posterior portion of said housing is movable and said generator comprises a piezoelectric polymer film.

12. The apparatus of claim 11 wherein said posterior portion is movable from side to side in the manner of a fish swimming.

13. The apparatus of claim 10 further comprising a decoupling device, wherein said decoupling device causes said coupling device to de-couple said housing from said object when said object is at or above a desired depth underwater or when said object stops moving, or both.

14. A method comprising:

reversibly coupling a housing to an object that is submerged in water, wherein said housing has a posterior portion and an anterior portion, and wherein said posterior portion is movable independently of said anterior portion; and generating energy by moving said housing through said water, wherein said energy is generated by movement of said posterior portion of said housing.

15. The method of claim 14 further comprising:

storing said energy in an energy storage device in said housing; and delivering the stored energy to a transmitter in said housing.

16. The method of claim 15 further comprising transmitting a signal through said water.

17. The method of claim 14 further comprising decoupling said housing from said object on occurrence of a condition.

18. The method of claim 17 wherein said condition is selected from the group consisting of said object being at or above a desired depth underwater and when said object stops moving.

19. The method of claim 14 wherein the operation of reversibly coupling a housing further comprises reversibly coupling a housing that has the shape of a water-dwelling organism.

* * * * *

UNITED STATES PATENT AND TRADEMARK OFFICE
CERTIFICATE OF CORRECTION

| | |
|---|---|
| PATENT NO. | : 7,113,097 B2 |
| APPLICATION NO. | : 10/700166 |
| DATED | : September 26, 2006 |
| INVENTOR(S) | : John Wallace Kline et al. |

Page 1 of 1

It is certified that error appears in the above-identified patent and that said Letters Patent is hereby corrected as shown below:

On The Title Page, Item (75)
Inventor "Frederick R. Dental" should be --Frederick R. Dentel-- with an "e".

Signed and Sealed this

Twenty-seventh Day of November, 2007

JON W. DUDAS
*Director of the United States Patent and Trademark Office*